US008872637B2

(12) United States Patent
Talstra et al.

(10) Patent No.: US 8,872,637 B2
(45) Date of Patent: Oct. 28, 2014

(54) METHOD FOR SELECTING A CONTROLLABLE DEVICE

(75) Inventors: Johan Comelis Talstra, Eindhoven (NL); Hendricus Theodorus Gerardus Maria Penning De Vries, Mierlo (NL); Lorenzo Feri, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 487 days.

(21) Appl. No.: 13/380,562

(22) PCT Filed: Jun. 14, 2010

(86) PCT No.: PCT/IB2010/052642

§ 371 (c)(1),
(2), (4) Date: Dec. 23, 2011

(87) PCT Pub. No.: WO2010/150132

PCT Pub. Date: Dec. 29, 2010

(65) Prior Publication Data

US 2012/0092143 A1 Apr. 19, 2012

(30) Foreign Application Priority Data

Jun. 23, 2009 (EP) .................................... 09163443

(51) Int. Cl.
*G05B 11/01* (2006.01)
*H05B 37/02* (2006.01)
*G08C 17/02* (2006.01)
*G08C 23/04* (2006.01)

(52) U.S. Cl.
CPC ............ *G08C 23/04* (2013.01); *H05B 37/0272* (2013.01); *G08C 17/02* (2013.01); *G08C 2201/71* (2013.01)
USPC ........................................ 340/12.52; 398/106

(58) Field of Classification Search
USPC .......................... 398/106, 107, 108, 111, 112
See application file for complete search history.

(56) References Cited

U.S. PATENT DOCUMENTS

| | | | | |
|---|---|---|---|---|
| 7,034,999 B1 * | 4/2006 | Casler | .......................... | 359/356 |
| 2003/0107888 A1 * | 6/2003 | Devlin et al. | ................ | 362/233 |
| 2007/0043453 A1 | 2/2007 | Buil | | |
| 2009/0054067 A1 | 2/2009 | Gauthier et al. | | |
| 2012/0098692 A1 * | 4/2012 | Talstra et al. | ................ | 341/176 |

FOREIGN PATENT DOCUMENTS

| | | | |
|---|---|---|---|
| DE | 102006048547 | A1 | 5/2008 |
| WO | 2006111930 | A2 | 10/2006 |

* cited by examiner

*Primary Examiner* — Brian Zimmerman
*Assistant Examiner* — Sara Samson
(74) *Attorney, Agent, or Firm* — Meenakshy Chakravorty

(57) ABSTRACT

The present invention relates to a method for selecting at least one of a plurality of controllable devices (121-123), wherein each of the controllable devices (121-123) is adapted to transmit a distinguishable signal. The method comprising the steps of receiving (301) the signals from the plurality of controllable devices by means of a plurality of receiver modules comprised in a control device (110), wherein each receiver module separately detects a contribution of the signals; determining (302), using a correlation between the different signal contributions, a width and an angle of incidence for each of the signals; comparing (303-304) the width and the angle of incidence for each of the signals with a set of predetermined criteria; and selecting (305) at least one of the plurality of controllable devices best matching the set of predetermined criteria.

15 Claims, 4 Drawing Sheets

METHOD FOR SELECTING A CONTROLLABLE DEVICE

TECHNICAL FIELD

The present invention relates to a method for selecting at least one of a plurality of controllable devices. The present invention also relates to a control device using such a method, and to a system comprising such a control device and a plurality of controllable devices.

BACKGROUND OF THE INVENTION

In current lighting systems, including multiple light sources, selection and control of the light sources usually occurs by fixed devices, such as wall panels having switches. The switches are used to control the light sources, such as to turn them on/off or dim them. In the event a user desires to change any lights, the user must return to the wall panel. Of course, the user needs to know which switch controls which light source. However, often the user does not have this information as switches or light sources are not marked. Such a situation is particularly problematic in the case of multiple light sources and multiple switches, where the switch that controls the desired light source is found by trial and error.

Recent developments have created remote control devices emitting a directional selection beam useful for selecting and adjusting light sources. The use of remote control devices, however, provides the risk of accidentally selecting a device (e.g. a light source) other than the desired device. Therefore, a trade-off must be made between ease of selecting a device (favoring a wide selection beam from the remote control) and avoiding the risk of selecting multiple devices (favoring a narrow selection beam from the remote control).

US2003/0107888 discloses a remote-control modular lighting system utilizing a directional wireless remote control for the selective adjustment and programming of individual lighting modules. Individual lighting modules may be selected for adjustment by momentarily pointing the remote control at the lighting module to be adjusted. Subsequent adjustments may be done without aiming at the lamp, allowing the operators attention to be on the object being lit. The adjustments may include switching on/off, dimming, changing colour, and aiming the light of the light source (i.e. adjustment of the light distribution). If lighting modules are spaced tightly such that multiple modules are selected by the directional selection beam, the remote control comprises an added feature enabling a user to cycle through the selected lamps by pressing a select button repeatedly, until an indicator on the desired lamp module is lit.

However, it may be desirable to provide an improved way of selecting at least one controllable device, such as a light source, out of a plurality of controllable devices.

SUMMARY OF THE INVENTION

According to an aspect of the invention, the above is at least partly met by a method for selecting at least one of a plurality of controllable devices, wherein each of the controllable devices are adapted to transmit a distinguishable signal. The method comprising the steps of receiving the signals from the plurality of controllable devices by means of a plurality of receiver modules comprised in a control device, such as a remote control device, wherein each receiver module separately detects a contribution of the signals; determining, using a correlation between the different signal contributions, a width and an angle of incidence for each of the signals; comparing the width and the angle of incidence for each of the signals with a set of predetermined criteria; and selecting at least one of the plurality of controllable devices best matching the set of predetermined criteria.

The non-published application PCT/IB2009/052363 by the applicant and fully incorporated by reference, discloses a method for selecting a controllable device from a plurality of controllable devices by: transmitting a signal from each of the controllable devices to a remote control device; determining an angular deviation between the remote control device and each of the controllable devices based on the angle of incidence of the signal as received by the controllable device; and selecting a controllable device based on the angular deviation. However, when a plurality of controllable devices are arranged in a structure, such as a room, the signals may be reflected e.g. off the walls. Therefore signals are sometimes not only received by the control device from along the line-of-sight to the controllable devices, but also from other directions due to specular and/or Lambertian reflections of the signals. Thus, if the control device selects a controllable device based on the angular deviations between the control device and the various controllable devices, the control device may point in a direction that corresponds to a specular reflection on the wall, whereas the control device "thinks" it is pointing at the controllable device from which the signal originates. For example, if a first controllable device is arranged near a reflection of a signal originating from a second controllable device, a situation may occur where a user points the control device towards the first controllable device, but the control device accidentally selects the second device since the angle between the control device and the reflection associated with the second controllable device is smaller than the angle between the control device and the signal from the first device.

The present invention is based on the understanding that as a signal is reflected on a surface, such as a wall, this will affect the width of the signal (as perceived by a receiver in a control device). In particular, the width will increase after reflection. Studies of reflections from various types of light sources on walls have been conducted by taking a picture of a light source with a camera (i.e. when light is received along the line-of-sight) and then taking a picture of a reflection of the same light source. These studies have revealed that reflections tend to have a width measuring 40° in diameter or more, where the width may e.g. be measured as the angular distance between the points where the intensity drops to 50% with respect to the maximum or full width half maximum (FWHM), or, if the light distribution is being fit to a Gaussian distribution, the width may be the characterized by the latter's standard deviation. This generally holds for pointing locations where the user is standing not too close (>1 m) to the wall being pointed at. Light sources themselves, on the other hand, typically have a width being only a few degrees or less in diameter at distances >0.5 meter (i.e. in the field-of-view of the control device the light source only subtends an angle of a few degrees, and thus has a small width). Thus, the width of a reflected signal will typically be substantially wider than a similar signal received directly from the light source (i.e. along the line-of-sight path). Thus, by considering the width of the received signals, reflections can be suppressed with respect to the devices themselves.

The signals may, for example, be optical signals (such as infrared), radio frequency signals (e.g. 60 GHz), or ultrasound (>20 kHz). The signals are preferably sufficiently different from background noise, using e.g. pseudorandom number sequences. Furthermore, the signals may have orthogonal or quasi-orthogonal identification codes enabling the use of identification codes with special cross-correlation features to distinguish signals that originate from different controllable devices, thereby reducing or eliminating interference. Further, in the event the controllable device is a lamp or a luminary comprising a set of light emitting elements, the light originating from the light emitting elements may be used as the signal, thereby eliminating the need for a separate transmitter for the signals.

The comparison with the set of predetermined criteria may be such that it favours a controllable device having a signal with a small width. For example, the comparison with the set of predetermined criteria may be such that any controllable device having a signal with a width exceeding a predetermined threshold value is not selectable. By using an appropriate threshold value, any controllable device having a signal that has been reflected may be excluded. Thereby the controllable devices that are actually located in the pointing direction of the control device may be identified. Then, at least one of these controllable devices may be selected according to one or more additional criteria. The threshold value may, for example, be set to exclude controllable devices having a signal with width that exceeds 10°, or more preferably a width that exceeds 20°, such as a width exceeding 40°.

According to an embodiment, the predetermined threshold value may be a function of the signal strength of the received signal, or put differently, the comparison with the set of predetermined criteria may favour a controllable device having a signal with high signal strength. An advantage is that the threshold value may be adapted to the type of signal that is transmitted by the controllable device. This enables the method to be used also for signals that are relatively wide (also when not reflected). An example of such a signal would be light emitted by a "wall washer".

The comparison with the set of predetermined criteria may preferably favour a controllable device having a signal with a small angle of incidence. For example, a criterion may be that the controllable device that has the signal with the smallest angle of incidence (from among the controllable devices that are selectable) is selected. An advantage is that the measured angles of incidence can be made insensitive to the amplitude of the signals. Consequently, attenuation of the signal(s), e.g. due to obstructions such as lamp shades, does not harm the ability to obtain appropriate information on the angles of incidence.

According to an embodiment, each of the receiver modules may include a photodiode. Alternatively, the receiver modules may be pixels in an imaging circuitry, e.g. in a camera, such as a CCD (Charge Couple Device) sensor or a CMOS (Complementary Metal-Oxide-Semiconductor) sensor. This enables the angle and width to be determined using simple object recognition techniques.

The comparison with the set of predetermined criteria may be such that any controllable device that has a signal for which at least one of the signal contributions is below a predetermined noise threshold is not selectable. This may suppress the effect of noise sources present in the system, such as shot-noise in the photodiodes, thermal noise in a circuitry amplifying the signal from the photodiode, and ambient optical or radio frequency noise in the room.

According to an embodiment, the width and/or angle of incidence of the signal can be determined by fitting a target distribution (such as a Gaussian distribution) parameterized by offset-angle and width (and optionally amplitude) to the signal contributions. This enables the width and angle of incidence to be determined also from a small number (e.g. three) of different signal contributions. A further discussion in relation to the fitting will be provided below.

According to another aspect of the invention, there is provided a control device for use with a plurality of controllable devices, wherein each of the controllable devices is adapted to transmit a distinguishable signal, the control device comprising: a plurality of receiver modules, wherein each receiver module is adapted to separately detect a contribution of the signals; and a control unit arranged to perform the above described method for selecting at least one of the plurality of controllable devices. This aspect of the invention provides similar advantages as discussed above in relation to the previous aspect of the invention. Furthermore, the control device according to the present invention may advantageously be included in a system further comprising a plurality of controllable devices adapted to transmit a distinguishable signal.

According to one embodiment, the controllable devices may be light sources, such as lamp devices or luminaries, containing one or more light emitting elements. In such an embodiment, the distinguishable signal may advantageously be transmitted by means of the light emitting elements. This eliminates the need of a separate transmitter.

According to yet another aspect of the invention, there is provided a method for use in a system comprising a control device and a plurality of controllable devices, wherein the control device is adapted to transmit a signal comprising a plurality of distinguishable signal contributions. The method comprising the steps of receiving said signal by means of receivers arranged in the plurality of controllable devices; determining, for each controllable device that has received the signal, a width and an angle of incidence of the received signal using a correlation between the distinguishable signal contributions; and comparing the width and the angle of incidence for the received signals with a set of predetermined criteria; and selecting at least one of the plurality of controllable devices having a received signal best matching the set of predetermined criteria. The set of predetermined criteria may be similar to the criteria discussed above. This aspect of the invention corresponds to the previous aspects and provides similar advantages. However, the concept is reversed such that the control device is provided with means for transmitting a signal comprising a plurality of signal contributions, which signal may be received by a receiver in each controllable device, wherein the width and angle of incidence of a received signal can be determined by the controllable devices or in combination with the control device. Moreover, this aspect falls within the main inventive concept, i.e. determining a width and angle of incidence of a received signal and comparing the width and angle to a set of predetermined criteria.

According to an embodiment, the method may further comprise the step of transmitting information about the width and angle of incidence to the control device for subsequent use in selection of the at least one controllable device. This means that the computation of angle and/or width may take place in the controllable devices.

According to another embodiment, the method according may further comprise the step of transmitting information about the distinguishable signal contributions to the control device for subsequent use in determining the width and angle of incidence of the received signal. An advantage herewith is that in a typical lighting application, the control device may be arranged to have more computational power than the controllable devices.

This method may advantageously be used in a system comprising a control device and a plurality of controllable devices, wherein the control device is adapted to transmit a signal comprising a plurality of distinguishable signal contributions.

Further features of, and advantages with, the present invention will become apparent when studying the appended claims and the following description. The skilled addressee realizes that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1A:
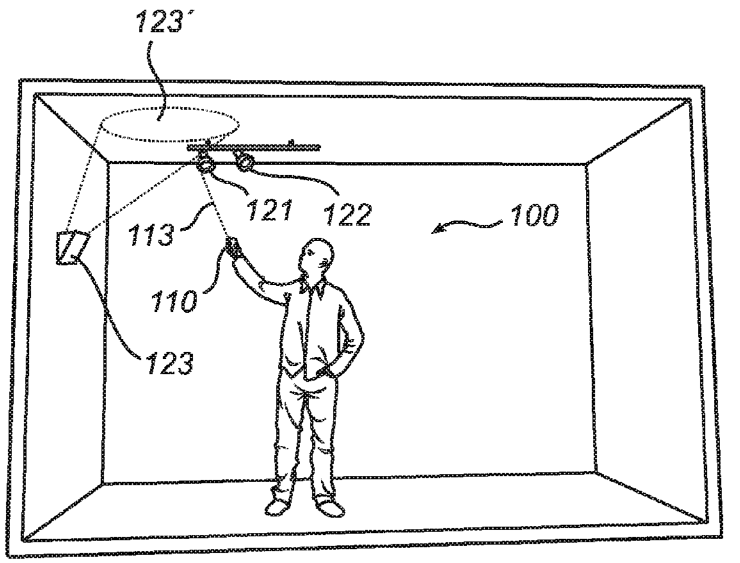
FIG. 1*a* schematically illustrates a system according to an embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1B:
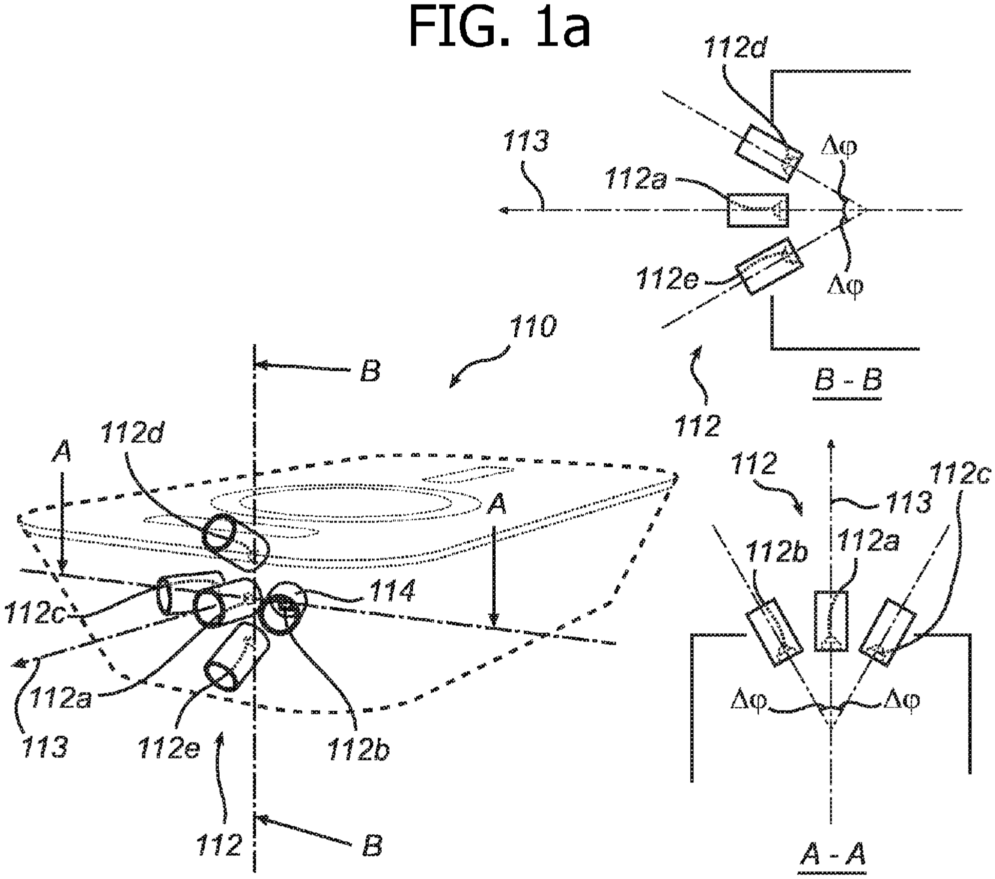
FIG. 1*b* schematically illustrates a control device according to an embodiment of the invention.

Referring now to the drawings and to FIG. 1*a-b* in particular, there is depicted a system 100 arranged in a space such as a room. The system 100 comprises a control device 110, such as a remote control, and three controllable devices 121-123 in the form of controllable luminaries.

The controllable luminaries 121-123 are here spotlights, each including a set of light emitting elements (e.g. one or more light emitting diodes) arranged to emit light for illuminating the room. The first 121 and second 122 luminaries are here down-lights arranged to provide direct illumination of the room, whereas the third luminary 123 is an up-light arranged to provide indirect illumination by reflecting light at the ceiling as indicated by reflection 123'. All of the luminaries 121-123 emit light with the same (initial) width. However, reflection 123' on the ceiling is wider than the other luminaries 121,122 from the point of view of the remote control 110.

Further, each luminary 121-123 is provided with a control unit in electrical connection with the light emitting elements of the respective luminaries 121-123. Each of the control units of the luminaries 121-123 is configured to modulate the emitted light to contain an individual identification code thereby enabling light from the different luminaries 121-123 to be distinguished. The identification codes are preferably chosen such that they are (quasi-) orthogonal with respect to each other in order to minimize interference between modulated light from different luminaries 121-123.

Figure 2:
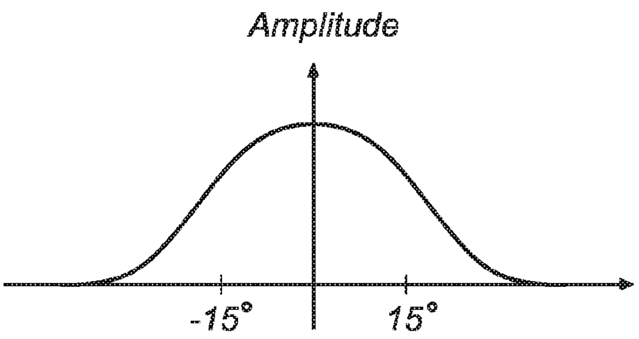
FIG. 2 schematically illustrates a response of a typical filter that can be used to restrict the field-of-view of a receiver module.

The remote control 110 also comprises a control unit in electrical connection with a receiver 112. The receiver 112 comprises five (preferably identical) receiving modules 112*a-e*, here being photo (receiver) diodes. The photodiodes 112*a-e* are arranged such that there is one photodiode 112*a* in the centre and four surrounding photodiodes 112*b-e*. The centre photodiode 112*a* preferably points along the pointing direction 113 of the remote control device 110 (i.e. the direction in which a user aims the remote control), whereas the surrounding photodiodes 112*b-e* preferably are arranged at a regular angular displacement. Here, each of the surrounding photodiodes 112*b-e* points in a direction which deviates from the pointing direction 113 of the remote control device 110 with an angle $\Delta\phi$. The angle $\Delta\Phi$ may vary, e.g. due to the geometry of the photodiodes and their placement in the receiver 112, but is typically in the range 10° to 15°. Here, $\Delta\Phi$ is about 15°. Furthermore, each photodiode 112*a-e* has a field-of-view (FOV) accordingly, i.e. an angular range where it can detect impinging light. An angular filter may be provided for each photodiode 112*a-e* to restrict the field-of-view. The filter is here achieved by arranging a tube 114 on top of the photodiode 112*a-e*. However, the angular response of the photodiodes 112*a-e* may also be restricted with e.g. lenses or specially constructed photodiodes. A response of a typical filter is illustrated in FIG. 2. As illustrated, the field-of-view of each of the photodiodes is here about ±15° C. from the centre axis of the photodiode.

Figure 3:
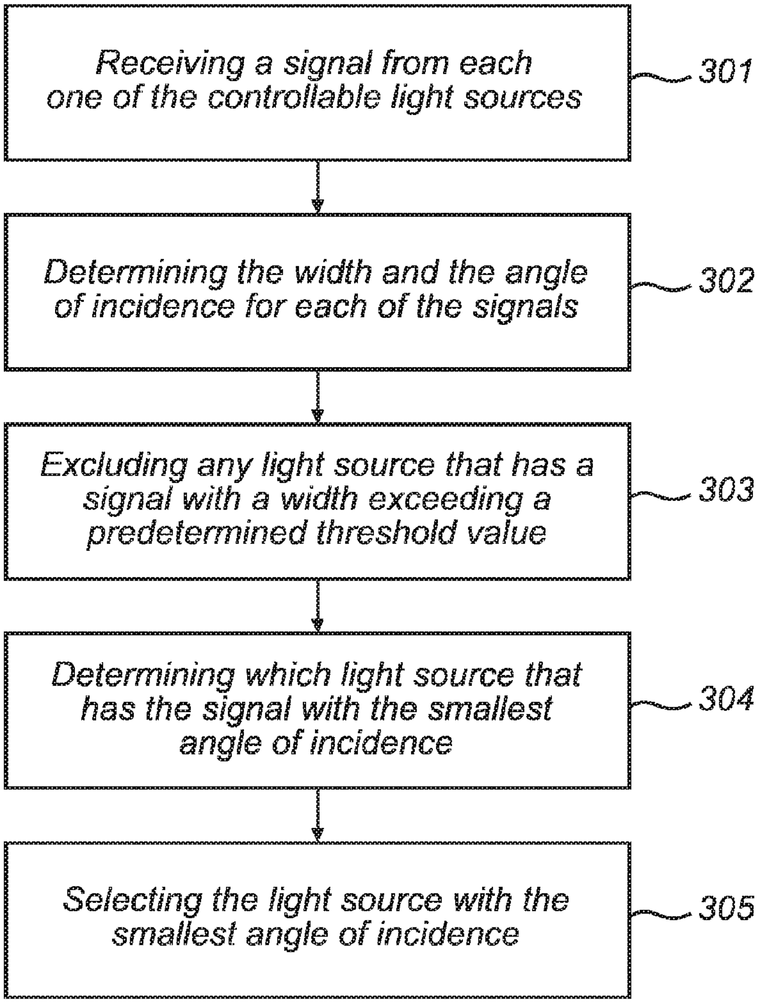
FIG. 3 is a flow chart of a method for selecting a controllable device according to an embodiment of the invention.

The operation of the system 100 will now be described with reference to the flow chart in FIG. 3. To provide a clear and concise description, the width and angle of incidence of any signals are here determined only for a first (horizontal) plane using the centre 112*a*, left 112*b* and right 112*c* photodiodes of the remote control. A possible generalization to three dimensions will then be discussed.

In operation, each of the controllable luminaries 121-123 transmits a signal in the form of modulated light containing an identification code for the respective luminary 121-123. The signals are received, in step 301, by the receiver 112 in the remote control 110. The control unit in the remote control device 110 distinguishes the signals from the various luminaries 121-123 using the identification codes, and, for each signal, determines a signal contribution for each of the photodiodes 112*a-c*. The signal contribution is indicated by the photocurrent from the associated photodiode 112*a-c*.

Figure 4A:
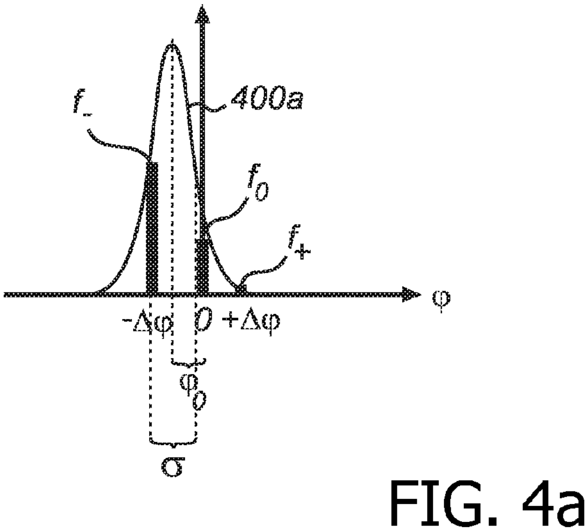
FIGS. 4*a*, 4*b*, 4*c* schematically illustrate how a width and an angle of incidence can be determined for a signal by fitting a Gaussian distribution to a set of signal contributions.
Figure 4B:
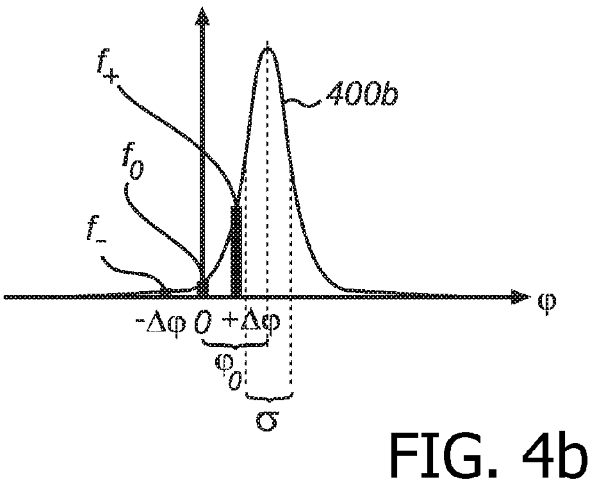
Figure 4C:
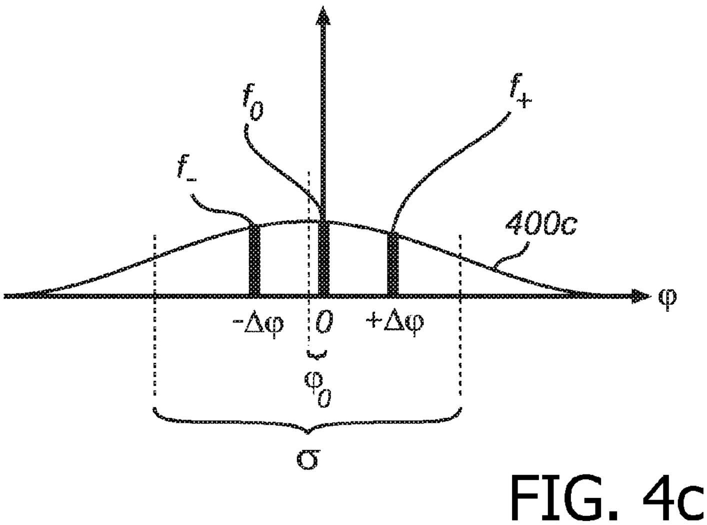

The signal contributions for the signal received from the first luminary 121, are schematically illustrated in FIG. 4*a*. Here, the signal contributions detected by the centre 112*a*, left 112*b* and right 112*c* photodiodes are denoted $f_0$, $f_-$, and $f_+$, respectively. Thus, photodiode 112*a* samples the intensity distribution at $\phi=0°$, photodiode 112*b* samples the intensity distribution at $\phi=-\Delta\phi$ and photodiode 112*c* samples the intensity distribution at $\phi=+\Delta\phi$. Further, FIG. 4*b* shows the signal contributions for the signal received from the second light 122, whereas FIG. 4*c* shows the signal contributions for the signal received from the third luminary 123 (via reflection 123').

The control unit of the remote control 110 then determines the width and the angle of incidence for each signal, in step 302, using a correlation between the different signal contributions. Here, this is achieved by fitting a Gaussian distribution to the signal contributions associated with the signal. Thus, for each signal a system of equations is achieved:

$$f_0=Ae^{-(0-\phi_0)^2/2\sigma^2}$$

$$f_-=Ae^{-(-\Delta\phi-100_0)^2/2\sigma^2}$$

$$f_+=Ae^{-(\Delta\phi-\Delta_0)^2/2\sigma^2}$$

This system of equations can now be solved for σ, $\phi_0$ and A in terms of the known/measured numbers $\{\Delta\phi, f_0, f_-, f_+\}$.

Thus, the standard deviation $$\sigma = \Delta\varphi\log\left[\frac{f_0^2}{f_+ f_-}\right]^{-1/2}$$

indicates the width of the signal, the centre $\phi_0=\frac{1}{2}\log[f_+/f_-]\,\sigma^2/\Delta\phi$ indicates the angle of incidence of the signal, whereas A is the amplitude of the signal. The angle of incidence is here the angle between the pointing direction of the control device and the direction of the impinging signal.

A Gaussian distribution 400*a* fitted to the signal contributions $f_0$, $f_-$, and $f_+$ associated with the signal from the first luminary 121 is schematically illustrated in FIG. 4*a*. Similarly, a Gaussian distribution 400*b* fitted to the signal contributions $f_0$, $f_-$, and $f_+$ associated with the signal from the second luminary 122 is schematically illustrated in FIG. 4*b*, whereas a Gaussian distribution 400*c* fitted to the signal contributions $f_0$, $f_-$, and $f_+$ associated with the signal from the third luminary 123 (via reflection 123') is schematically illustrated in FIG. 4*c*. It may be appreciated by a person skilled in the art that a better fit and better estimates can be achieved by using more photodiodes (and thus more signal contributions).

In step 303-305, the control unit compares the width and the angle of incidence for each of the signals with a set of predetermined criteria.

In step 303, a first predetermined criterion may be used to exclude luminaries having a signal with a width that exceeds a predetermined threshold value. For example, the predetermined threshold value can be set to exclude luminaries for which the received signal has a light intensity distribution with a standard deviation, σ, exceeding 20°. As illustrated in FIG. 4*a-c*, the signals received from the first 121 and second 122 luminaries have a relatively small width (e.g. σ≈10°) whereas the signal received from the third luminary 123, via reflection at 123', is substantially wider (e.g. σ≈60°). Thus, the third luminary 123 will be excluded and only luminary 121 and luminary 122 will remain selectable.

In step 304, a second predetermined criterion is used to determine which of the luminaries 121-123 (among the selectable luminaries 121-122) that has the signal with the smallest angle of incidence. As indicated in FIG. 4*a-b*, the angle of incidence (e.g. $\phi_0\approx10°$) of the signal received from the first luminary 121 is smaller than the angle of incidence ($\phi_0\approx30°$) of the signal received from the second luminary 122, and thus the control unit in the remote control 110 will select the first luminary 121 in step 304. Once a controllable luminary has been selected, the remote control can be used to control the illumination according to techniques well-known in the art.

It can be noted that the angle of incidence (e.g. $\phi_0=5°$) of the signal received from the third luminary 123, via reflection at 123', is smaller than the angle of incidence ($\phi_0\approx10°$) for the signal received from the first luminary 121. Thus, if the selection was based only on the angle of incidence of the signal, the remote control would have selected the third luminary 123 instead of the first luminary 121.

It is recognized that, instead of excluding luminaries having a signal with a high width, in step 303, one may use a function which is configured such that it is less likely that a luminary having a signal with a high width (and/or a high angle of incidence) is selected. For example, a cost function may be used where the angle of incidence is weighted based on the width of the signal, i.e. the value of the cost function is higher for a higher angle of incidence of the signal and for a higher width of the signal. Then, the luminary that has the signal with the lowest value of the cost function may be selected.

Although the width and angle of incidence of a signal have here been determined only in the first (horizontal) plane using the centre 112*a*, left 112*b* and right 112*c* photodiodes of the remote control 110, it is recognized that this technique can be extended to three dimensions. For example, one may determine the width and angle of incidence for the signal in a second (vertical) plane using the centre 112*a*, upper 112*d*, and lower 112*e* photodiodes, and then estimate the angle of incidence and width of the signal in three dimensions as:

$$\sigma=\max(\sigma_H,\sigma_V) \text{ and } \phi=|\phi_H|+|\phi_v|, \text{ where}$$

$\sigma_H$ is the standard deviation in the horizontal plane;

$\phi_V$ is the standard deviation in the vertical plane;

$\phi_H$ is the angle of incidence in the horizontal plane; and $\phi_V$ is the angle of incidence in the vertical plane.

Furthermore, since a Gaussian distribution typically tends to overestimate the width and the angle of incidence with about 25-50% for signals having a high angle of incidence, a correction can be applied. The correction may vary (e.g. due to the photodiodes used), but an example of a correction would be $\rightarrow\phi/(1+\alpha\phi^2)$, $\sigma\rightarrow\sigma/(1+\alpha\phi^2)$, where a is some constant, e.g. α=30°.

In the procedure described above, the estimated width typically depends on the inherent width of the signal from the luminary and the field-of-view of the photodiodes. This can make it difficult to estimate the true width for signals where the estimated standard deviation σ is equal to or less than the field-of-view (FOV) of the photodiodes.

Therefore the field-of-view of the photodiodes should be sufficiently small, preferably each photodiode has a FOV less than 15° or more preferably less than 10°. On the other hand a very small field-of-view makes it difficult for the user to "find" a luminary (i.e. point sufficiently accurately at the luminary). This trade-off can be accommodated by adding more photodiodes. Thus, when designing the receiver 112, the following rule may be applied:

the required human pointing-accuracy≈(N−2). FOV, where N denotes the number of photodiodes; and FOV is the field-of-view for each individual photodiode.

For some type of luminaries the emitted light may have a relatively wide width (also without reflection). An example of such a luminary would be a "wall washer". This is a luminary that projects a broad pattern on a wall for accent lighting. For example, for a two meter wide wall washer, the remote control may perceive a width σ=45° at a distance of two meters from the wall, and a width σ=6° at a distance of ten meters from the wall. That is, at a close distance (e.g. 1 to 2 meters away), the width of light from the wall washer is very wide, just like a reflection. Consequently, to distinguish a wall washer from a reflection one may not rely on a fixed predetermined threshold value.

What sets the wall washer apart from the reflection is that (when the perceived width of the wall washer is high) its power is substantially higher than for a reflection. Thus, by utilizing a power dependent threshold value, the wall washer may be distinguished from a reflection. An example of such a threshold is $T_i=\sqrt{P_i+FOV^2}$, where $T_i$ is the threshold value for luminary i, $P_i$ is the properly normalized power for the signal received from luminary i, and FOV is the field-of-view of an individual photodiode. In a typical application the threshold may vary between 15° and 50°.

It may be noted that the threshold value $T_i=\sqrt{P_i+FOV^2}$ has the desired behavior in two regimes. First, when the remote control is at a relatively close distance, r, from the luminary, the strength of the received signal is large and the measured width is larger than the field-of-view of the photodiodes in the receiver. In this regime the measured width is supposed to scale like 1/r and the signal strength like $1/r^2$, i.e. $\sigma_i \sim \sqrt{P_i}$, where $\sigma_i$ is the width for the signal received from luminary i. Second, when the remote control is at a large distance, r, from the luminary, the strength of the received signal is small and the measured width is roughly constant, because it saturates at the field-of-view of the receiver (every measured light distribution is at least as wide as the receiver's field-of view), i.e. $\sigma_i \sim FOV$, where $\sigma_i$ is the width for the signal received from luminary i.

Additionally, one or more additional predetermined criteria may optionally be used. For example, there may be a predetermined noise threshold such that signal contributions below the predetermined noise threshold (e.g. three times the standard deviation of the noise, depending on the desired false positive probability) can be rejected. This suppress the effect of noise sources present in the system, such as shot-noise in the photodiodes, thermal noise in the circuitry amplifying the signal from the photodiode, and ambient optical or radio frequency noise in the room.

Another predetermined criterion may be a predetermined angle threshold. Some luminaries may produce a weaker signal because they are further away or more attenuated by a lampshade. This implies that the area in which those "weaker" luminaries produce a photocurrent above the predetermined noise threshold (and thus the area in which they could potentially be selected) is considerably smaller than for "stronger" luminaries. To limit this counterintuitive behavior, any luminary that has a signal with an estimated angle of incidence $\phi_0$ which exceeds a predetermined threshold (e.g. 25°) may be excluded from selection.

Figure 5:
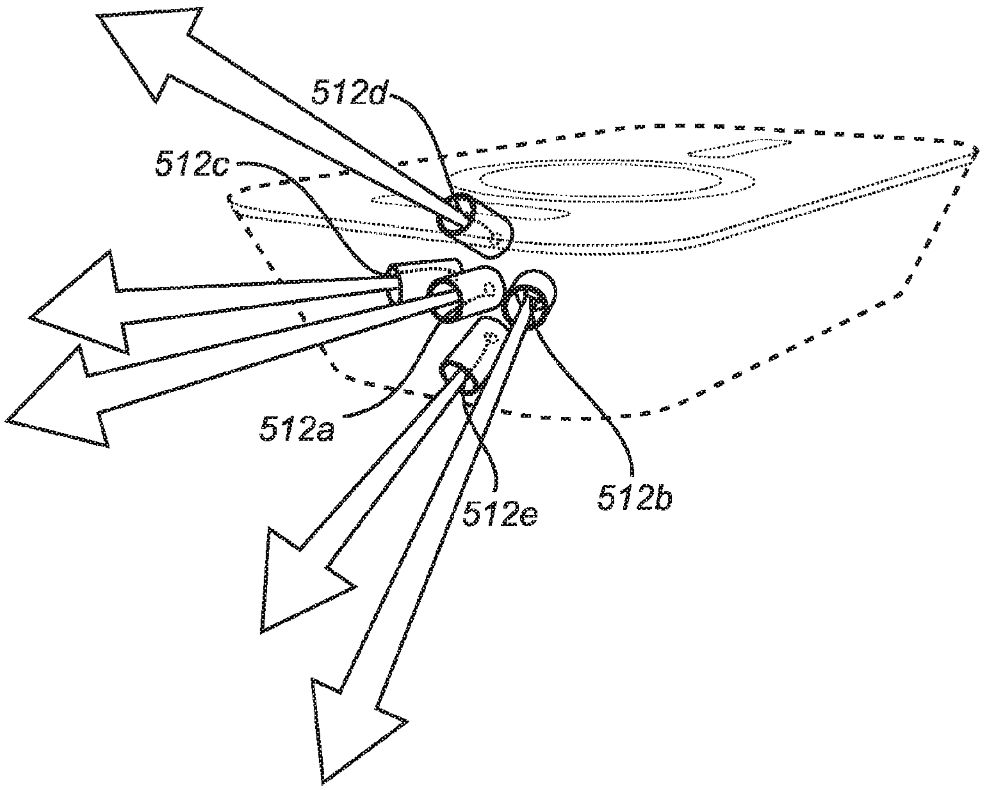
FIG. 5 schematically illustrates a system according to another embodiment of the invention.

FIG. 5 illustrates an alternative embodiment of the invention where the concept is reversed such that the remote control is provided with means for transmitting a signal comprising a plurality of signal contributions, which signal may be received by a receiver in each controllable device, wherein the width and angle of incidence of a received signal can be determined by the controllable devices or in combination with the control device.

Such a system may be achieved by replacing the photo receiver diodes in the remote control in the previous embodiments with photo transmitter diodes 512*a-e*, and arranging a receiver, that may be a single photo receiver diode, in each of the plurality of controllable devices (which may be luminaries). In operation, each photo transmitter diode 512*a-e* in the remote control transmits a distinguishable signal contribution, wherein preferably all of the signal contributions have the same strength. The distinguishable signal contributions can be seen as a set of sub-signals forming a signal that is received by the photo receiver diode in each controllable device. Each controllable device may then determine a width and an angle of incidence of the received signal based on the strength of the distinguishable signal contributions by fitting a Gaussian or other distribution to the signal contributions, wherein the standard deviation, σ, of the Gaussian distribution indicates the width and the centre $\phi_0$ indicates the angle of incidence. This can be achieved in a similar manner as has been described above. Information about the width and angle of incidence can then be transmitted to the control device which may select the controllable device that best match a set of predetermined criteria, wherein the predetermined criteria may be similar to the ones described above. Alternatively, the controllable devices may transmit their measured distinguishable signal contributions to the control device, where the latter determines the width and angle of incidence of the received signal for every controllable device by fitting (for every controllable device) to a Gaussian or other distribution. It can be noted that this embodiment, is based on the same principle as the embodiment described above, i.e. determining a width and angle of incidence of a received signal and comparing the width and angle to a set of predetermined criteria in order to select a controllable luminary.

Even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. For example, instead of using a signal in the form of modulated light transmitted by the light emitting elements in the controllable luminary, a separate signal transmitter may be used to transmit the signal. Such a transmitter may for example transmit optical signals (such as infrared (IR)) or radio frequency (RF) signals. If the transmitter is a RF-transmitter each receiver module in the remote control is an RF-detector. An advantage herewith is that any flickering perceived by a user may be avoided. Furthermore, the controllable devices are not necessarily luminaries but may represent alternative devices, such as e.g. awnings, switches or doors. Moreover, the remote control device may be a single, handheld device or a combination of a handheld device and a central controller. Moreover, alternative configurations of the receiver in the remote control may be utilized. It is also possible to use other techniques to estimate the width and angle of incidence of a signal. For example, if it is assumed that the intensity distribution of the received signal is approximately circularly symmetric, it is possible to use a directional receiver with a single central receiver module and surrounding receiver modules (e.g. three modules arranged on the corners of an equilateral triangle or 2 or more receiver modules with successively larger fields-of-view, oriented in the same direction). The detected signal contributions may then be fitted only in the radial direction to a target distribution in the form of three concentric rings. Furthermore the receiver modules may have different fields of view. The signal contributions may also be regarded as samples in a (un-normalized) probability distribution, wherein the mean and standard deviation of this distribution would give estimates of the angle of incidence and the width of the signal. The receiver modules may also be pixels in an imaging circuitry, e.g. in a camera, such as a CCD (Charge Couple Device) sensor or a CMOS (Complementary Metal-Oxide-Semiconductor) sensor. This allows the width and angle of incidence to be determined using object recognition techniques.

Furthermore, in the claims, the word "comprising" does not exclude other elements or steps, and the indefinite article "a" or "an" does not exclude a plurality.

The invention claimed is:

1. Method for selecting at least one of a plurality of controllable devices, wherein each of said controllable devices is adapted to transmit a distinguishable signal, the method comprising the steps of:

receiving the signals from the plurality of controllable devices by means of a plurality of receiver modules comprised in a control device, wherein each receiver module separately detects a contribution of said signals;

determining, using a correlation between the different signal contributions, a width and an angle of incidence for each of said signals;

comparing the width and the angle of incidence for each of said signals with a set of predetermined criteria; and selecting at least one of the plurality of controllable devices best matching the set of predetermined criteria.

2. Method according to claim 1, wherein the comparison with the set of predetermined criteria favors a controllable device having a signal with a small width.

3. Method according to claim 1, wherein the comparison with the set of predetermined criteria is such that any controllable device having a signal with a width exceeding a predetermined threshold value is not selectable.

4. Method according to claim 3, wherein said predetermined threshold value is a function of the signal strength of the received signal.

5. Method according to claim 1, wherein the comparison with the set of predetermined criteria favors a controllable device having a signal with a small angle of incidence.

6. Method according to claim 1, wherein the comparison with the set of predetermined criteria is such that any controllable device having a signal for which at least one of the signal contributions is below a predetermined noise threshold is not selectable.

7. Method according to claim 1, wherein at least one of the width and angle of incidence of the signal is determined by fitting a target distribution parameterized by angle and width to the signal contributions.

8. Control device for use with a plurality of controllable devices, wherein each of said controllable devices is adapted to transmit a distinguishable signal, said control device comprising:

a plurality of receiver modules, wherein each receiver module is adapted to separately detect a contribution of said signals; and a control unit arranged to perform the method of claim 1 to select at least one of the plurality of controllable devices.

9. Control device according to claim 8, wherein each of the receiver modules comprises a photodiode.

10. Control device according to claim 8, wherein the receiver modules are pixels in an imaging circuitry.

11. System comprising:

a plurality of controllable devices adapted to transmit a distinguishable signal; and a control device according to claim 8.

12. System according to claim 11, wherein said controllable devices are light sources comprising one or more light emitting elements and wherein said distinguishable signal is transmitted by means of said light emitting elements.

13. Method for use in a system comprising a control device and a plurality of controllable devices, wherein said control device is adapted to transmit a signal comprising a plurality of distinguishable signal contributions, the method comprising the steps of:

receiving said signal by means of receivers arranged in said plurality of controllable devices;

determining, for each controllable device that has received the signal, a width and an angle of incidence of the received signal using a correlation between the distinguishable signal contributions; and comparing the width and the angle of incidence for the received signals with a set of predetermined criteria; and selecting at least one of the plurality of controllable devices having a received signal best matching the set of predetermined criteria.

14. Method according to claim 13, further comprising the step of transmitting information about the width and angle of incidence to the control device.

15. Method according to claim 13, further comprising the step of transmitting information about the distinguishable signal contributions to the control device.

* * * * *